Oct. 18, 1932.  L. O. REICHELT  1,882,902
CABLE FORMING APPARATUS
Filed March 10, 1932   8 Sheets-Sheet 1

INVENTOR
L. O. REICHELT
BY E. R. Nowlan
ATTORNEY

Oct. 18, 1932.   L. O. REICHELT   1,882,902
CABLE FORMING APPARATUS
Filed March 10, 1932   8 Sheets-Sheet 4

FIG. 5.

INVENTOR
L. O. REICHELT
BY E. R. Nowlan
ATTORNEY

Oct. 18, 1932.  L. O. REICHELT  1,882,902
CABLE FORMING APPARATUS
Filed March 10, 1932   8 Sheets-Sheet 6

INVENTOR
L. O. REICHELT
BY E. R. Nowlan
ATTORNEY

Oct. 18, 1932.　　　　L. O. REICHELT　　　　1,882,902
CABLE FORMING APPARATUS
Filed March 10, 1932　　8 Sheets-Sheet 7

INVENTOR
L. O. REICHELT
BY
E. R. Nowlan
ATTORNEY

Oct. 18, 1932.   L. O. REICHELT   1,882,902
CABLE FORMING APPARATUS
Filed March 10, 1932    8 Sheets-Sheet 8

INVENTOR
L. O. REICHELT
BY
E. R. Nowlan
ATTORNEY.

Patented Oct. 18, 1932

1,882,902

UNITED STATES PATENT OFFICE

LESTER O. REICHELT, OF CRANFORD, NEW JERSEY, ASSIGNOR TO WESTERN ELECTRIC COMPANY, INCORPORATED, OF NEW YORK, N. Y., A CORPORATION OF NEW YORK

CABLE FORMING APPARATUS

Application filed March 10, 1932. Serial No. 597,947.

This invention relates to a cable forming apparatus, and more particularly to an apparatus for forming electrical cables used in communicating intelligence.

An object of the invention is to provide a simple and improved apparatus for economically manufacturing cables at high speeds.

The invention contemplates an assembly of apparatus for producing a uniform cable of substantially circular cross section and comprises an apparatus for assembling and binding a plurality of individual cable units, and a rotatable tractor type capstan for introducing a twist into the assembly and advancing the assembly to a take-up unit. The capstan is rotatable in either a clockwise or counter-clockwise direction depending upon the kind of twist to be introduced into the assembly of cable units. A recording mechanism is operatively connected with the capstan and is electrically actuated in response to the rotation thereof to record the length of the completed cable. The rate of speed at which the capstan is advancing the completed cable is indicated on a meter actuated by an electrical generator that is operatively connected with the capstan drive and responsive to the speed thereof. A core truck onto which is wound the completed cable is rotatably mounted in the take-up unit which has affixed thereupon a floating ring adapted with a hydraulic device for controlling the speed of rotation of the core truck and the amount of tension on the cable as it is wound onto the core truck.

The invention will become more readily apparent from the following description considered with reference to the accompanying drawings, wherein.

In general

Referring to the drawings in which corresponding parts throughout the several views are identified by the same reference numerals, the apparatus for manufacturing a uniformly compact cable by assembling and twisting together a plurality of the cable units produced by the apparatus disclosed in the patent granted to L. O. Reichelt, No. 1,813,197, issued on July 7, 1931, comprises in general (Figs. 1 and 2) a plurality of cable units 20 (in this case eighteen in number) wound upon core trucks 21 preferably aligned in two rows of nine each and passed along through suitable guides (not shown) affixed to the upper portions of stanchions appropriately spaced in tandem intermediate the two rows of core trucks 21 to a distributing plate 23, thence through a preliminary sizing bushing 24 and a floating sizing polisher 25. Subsequently, the assembly of cable units is passed through a serving head 26 by which a binding is applied thereto to maintain the cable units in proper relation. The assembly of cable units is then forwarded to a rotating capstan unit 28 of the tractor type and operatively connected with a measuring device 27, and projected therefrom as a cable 29 having a substantially circular cross section and thence passed to a take-up unit 30 for winding onto a core truck 35 rotatably mounted therein, the cable 29 being uniformly placed on the core truck 35 by a distributor 36. A twist is introduced into the assembly of cable units as it passes between the stationary distributor plate 23 and the point of entrance into the capstan unit 28, and the kind of twist depends upon the speed and direction of rotation of the capstan 28, both of which are controlled by a motor 37 which is employed to drive a main shaft 38, one end of which is adapted to drive the binder serving head 26 and the capstan unit 28, and the opposite end adapted to drive the take-up unit 30. The core truck 35 and the distributor 36 are driven through a floating ring 39 affixed to the front end of the take-up unit 30 and actuated by a shaft 31 operatively connected through a differential 40 with a fluid pump 41 and the main shaft 38.

*Assembling and sizing mechanism*

The distributing plate 23 (Figs. 1 and 2) preferably mounted upon a standard 43 rigidly attached to the floor consists of a disc provided with a plurality of perforations arranged so that the individual cable units 20 passing therethrough form the desired cable lay-up. In the embodiment disclosed herein, there are eighteen perforations arranged so that two are approximately in the center of the disc, six spaced equally in a circle therearound, and ten in a circle proximate the periphery of the disc. A metallic cone 48 formed with a central aperture for accommodating the two cable units 20 ultimately forming the core of the cable 29 is preferably affixed centrally upon a face of the disc so as to lie within the circle of the six perforations. A suitable sizing die is mounted in the central aperture of the cone at the end having the smaller cross section. The outer layers of cable units 20 pass outside the cone and are assembled about the core units into the approximate cross sectional area by the preliminary sizing bushing 24 positioned directly in front of the cone 48. A standard 50, preferably secured to the floor, supports the binder serving head 26. The standard 43 has a bracket 51 formed integral therewith for supporting one end of a table 52 extending between the standard 43 and the standard 50, the latter supporting the other end of the table in any suitable manner (not shown).

The preliminary sizing bushing 24 (Figs. 1 and 2) is preferably mounted in a support 53 which is secured to the table 52 adjacent the cone 48 and provided with a lever 54 for facilitating the adjustment of the position of the support 53 with respect to the cone 48. Also, the support 53 is provided with any suitable device whereby the preliminary sizing bushing 24 mounted therein can be readily changed to correspond approximately with the ultimate diameter of the cable 29.

The final sizing polisher 25 (Figs. 1 and 2) is contained in a housing 55 affixed to the table 52 intermediate the binder serving head 26 and the preliminary sizing bushing 24. The housing 55 provides a journal for one end of a rotatable tubular member 56, the opposite end of which extends into the binding serving head 26 and contains a sizing bushing 45 which is utilized to maintain the assembly of cable units 20 in a cable form approximating the ultimate configuration, thereby assuring a finished cable within the specified cross sectional area as the binding material is applied thereto.

*Binding serving mechanism*

The serving head 26 (Figs. 1, 2 and 5) consists of a protecting enclosure 58 and a sleeve 59 rotatably mounted on an end of a tubular member rigidly affixed to the standard 50 and provided with a plurality of radially projecting fingers for guiding the binder from the supply to the assembly of cable units. Projecting oppositely from the sleeve 59 are the arms 60, each of which is provided with means on its extremity to support rotatably a spool 61 containing a supply of paper or other suitable binding material for application to the assembly of cable units 20 to maintain them in the approximate relation as it is passed from the tubular member 56. The serving head 26 is preferably driven by an auxiliary shaft 62 (Fig. 5) which has a sprocket 63 connected by a chain 64 with a sprocket 65 affixed to an end of the main shaft 38. The auxiliary shaft 62 operates through a reversing gear device 68 of a type well known to the art to actuate a pulley 69 mounted thereon and connected with the sleeve 59 preferably by a belt 70. The rotation of the sleeve 59 causes the arms 60 and binder supply spools 61 to be revolved around the assembly of cable units 20 in order to apply an effective binding to the cable assembly as it passes from the tubular member 56.

The reversing gear device 68 enables the binding to be applied in either a right or left hand manner. The binding, which may be of paper or other suitable material, is applied in an overlapping fashion to the assembly of cable units 20, thereby maintaining the assembly of cable units 20 within the diameter fixed by the sizing bushing 45 as mounted in an end of the tubular member 56.

Capstan

Figure 12:
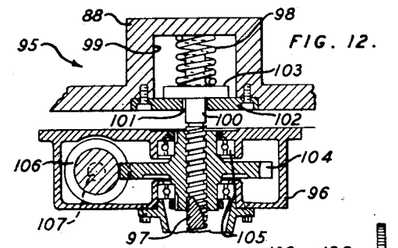
Fig. 12 is an enlarged fragmentary view taken along line 12—12 of Fig. 3.

The capstan unit 28 (Figs. 1 to 6 inclusive), which draws the cable through the apparatus, consists of a hollow cylindrical shell 75 having a left hand shaft portion 76 and a right hand shaft portion 77 journalled in pedestals 78 and 79, respectively, and preferably containing peripheral apertures which provide access to upper chain assembly 80 and lower chain assembly 81. The chain assemblies comprise driving sprockets 82, and idler sprockets 83 upon which a pair of endless chains 85 are rotatably mounted in caterpillar fashion. The upper chain assembly 80 (Fig. 6) is preferably mounted upon a hollow rectangular casting 86 firmly fastened to angle irons 87 extending longitudinally of the shell 75 and the lower chain assembly 81 (Fig. 6) is mounted upon a hollow rectangular casting 88 which is movably attached to the members 89 affixed rigidly to angle irons 90 extending longitudinally of the shell 75. The lower chain assembly 81 can be raised or lowered upon three spaced screw jacks 95 (Figs. 3 and 12) each of which comprises a housing 96 suitably secured to the frame or shell 75 and containing a screw 97 having a spring 98 fitted on end thereof projecting into a recess 99 formed in the casting 88. The screw 97 is formed with a square shank portion 100 which slidably engages a similar shaped aperture 101 formed in a plate 102 suitably attached to the casting 88. The screw 97 is also provided with a plate portion 103 mounted within the recess 99 and having the spring 98 bearing thereupon. The length of the shank portion 100 is sufficient to prevent a rotation of the screw 97 during the upward and downward movements of the casting 88.

A worm wheel 104 mounted on ball bearings 105 and provided with a centrally threaded portion for engaging the screw 97 meshes with a worm 106 affixed to a shaft 107 which is suitably mounted in the members 89 and actuated by a hand wheel 108. The raising and lowering of the chain assembly 81 is guided by rods 109, each of which projects through apertures 110 in the casting 88 and has one end 111 screwed into the immovable portion of the frame of the shell 75 and the opposite end firmly fitted into portions 112 of the upper casting 86. The employment of the springs 98 serves to transmit a definite pressure to the cable 29 as the lower chain assembly 81 is brought into engagement therewith, and yet affords sufficient flexibility to compensate for any variations which may occur in the cable as it passes through the capstan unit 28.

Figure 10:
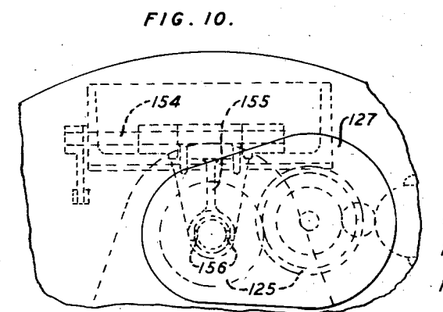
Fig. 10 is a fragmentary view taken along the line 10—10 of Fig. 3.
Figure 11:
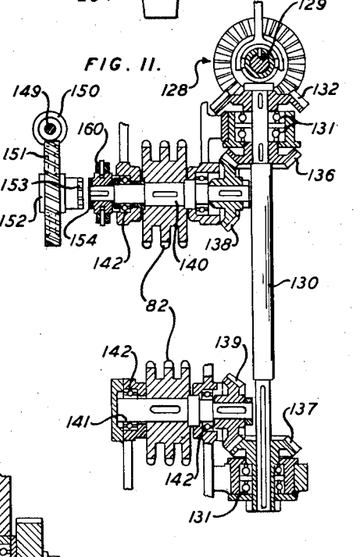
Fig. 11 is an enlarged fragmentary view taken along line 11—11 of Fig. 4 and showing details of the drives for the chain assemblies of the capstan.
Figure 13:
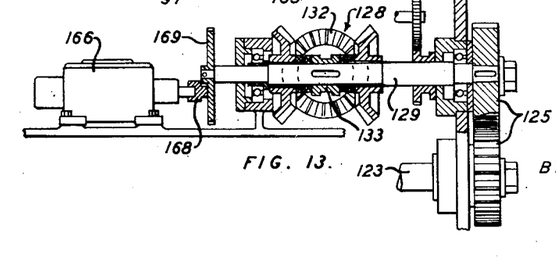
Fig. 13 is an enlarged fragmentary plan view taken along line 13—13 of Fig. 4 and showing details of chain drive reversing mechanism of the capstan.

The shell 75 and endless chains 85 are driven from the main shaft 38 through a spur gear speed reducer 117 (Figs. 1, 2 and 5) in which a pinion 118 fitted upon an end of the shaft 38 meshes with a gear 119, the latter adapted with a chain 120 for actuating the left hand shaft portion 76. Upon the pedestal 78 there is mounted a gear 121 meshing with a pinion 122 revolving around the periphery thereof to drive a shaft 123 and change gears 125 (Figs. 5, 10 and 13) through a jaw clutch 126, the gears 121 and 122 comprising a planetary gear arrangement. The change gears 125 are preferably contained in a housing 127 (Fig. 10) suitably attached to the external right hand face of the shell 75. A bevel gear reversing mechanism 128 (Figs. 5, 11 and 13) is connected with the change gears 125 by means of the shaft 129. A vertically positioned shaft 130 (Figs. 4, 5 and 11) mounted upon ball bearings 131 is adapted on one end with a bevel gear 132 for cooperation with the bevel gear reversing mechanism 128. In addition, the shaft 130 (Figs. 5 and 11) is provided with bevel gears 136 and 137 engaging the bevel gears 138 and 139, respectively, the latter two bevel gears being affixed to shafts 140 and 141, respectively, upon which the endless chain driving sprockets 82 are keyed. The shafts 140 and 141 are mounted upon ball bearings 142 and can be driven at variable speeds by employing the proper gear ratio in the change gears 125. A shaft 143 (Figs. 3 and 5) actuated by a lever 144 is adapted with a forked member 145 for operating the bevel gear reversing mechanism 128 which is slidably keyed to the shaft 129. The lever 144 is locked in position by a suitable spring actuated latch 146 (Fig. 3) engaging a slot in the shaft 143. Compression springs 147 mounted about an end portion of the shaft 143 are utilized for snapping one or the other of the bevel gears in the reversing mechanism 128 into engagement with a portion 133 keyed to the shaft 129.

The shafts 140 and 141 (Figs. 5 and 11) carrying the sprockets 82 are driven independently of the main shaft 38 by a motor 148 (Figs. 3 and 5) mounted within the shell 75 and rotatable therewith. The motor 148 actuates a shaft 149 (Figs. 3 and 5) having a worm 150 mounted on an end thereof and engaging a worm wheel 151 (Fig. 11) keyed to a shaft 152, the latter being adapted with a jaw clutch section 153 (Figs. 5 and 11) to receive a jaw clutch section 154 which is slidably keyed to the sprocket shaft 140.

It will be understood, of course, that when the endless chains 85 are being driven by the motor 148, then the main shaft 38 is disconnected from the endless chain drive by means of the disengagement of the sections of the jaw clutch 126 (Figs. 3 and 5), or when the main shaft 38 drive is being employed, then the jaw clutch sections 153 and 154 (Figs. 5 and 11) are disengaged to disconnect the motor 148 from the endless chain drive. The aforementioned motor 148 engagement and main shaft 38 disengagement, or vice versa operation, are accomplished simultaneously by rotating in a counter-clockwise direction, a lever 164 (Fig. 3) keyed to one end of a rock shaft 163. A rotation of the rock shaft 163 causes a clutch fork 155 (Fig. 5) mounted on an opposite end thereof and engaging the clutch 126 by means of trunnions 156 (Fig. 10) to slide a jaw of the clutch 126 along a key affixed to the shaft 123 to disengage the jaws of the clutch 126 (Fig. 3) for disconnecting the drive of the main shaft 38 from the sprocket shaft 140. As the main shaft 38 is being disconnected, the rock shaft 163 actuates a rod 157 (Fig. 3) connected with a crank 158 to rotate a vertical shaft 159 thereby moving in a rotary direction a clutch fork 160, which is attached to the trunnions engaging the clutch section 154 slidably keyed to the shaft 140. The jaw clutch section 154 (Fig. 11) is brought into engagement with the jaw clutch section 153 and the motor 148 (Fig. 5) drives the sprocket shaft 140 through the gear train hereinbefore described. A disconnection of the drive of the motor 148 and a drive through the main shaft 38 can be obtained by rotating the lever 164 in a clockwise direction whereby the clutch sections 153 and 154 are disengaged, and, simultaneously, the jaws of the clutch 126 are engaged. The lever 164 (Fig. 3) is provided with a suitable latch 165 whereby the former can be locked in position to maintain the drive of either the motor 148 or main shaft 38 on the sprocket shafts 140 and 141.

For measuring the rate of speed at which the cable is formed, there is employed an electrical tachometer consisting of a magneto 166 (Figs. 4 and 5) mounted within the shell 75 and connected with a speed indicator 167 (Fig. 5) suitably mounted remotely from the capstan unit 28. The magneto 166 is connected with the drive of the main shaft 38 by means of a pinion 168 engaging a gear 169 mounted on an end of the shaft 129 which drives the sprockets 82 and the endless chains 85. It will be evident, therefore, that the speed of the magneto 166 is instantly responsive to all changes in the speed of the drive shaft 129, and the current generated thereby is translated by the speed indicator 167 to indicate the feet per minute rate at which the endless chains 85 are advancing the cable. The generated current of the magneto 166 is conducted from the rotatable shell 75 by means of electrical conductors 170 attached to brushes 171 which rotate with the shell 75 and engage slip rings 172 rigidly affixed in a concentric manner to the pedestal 79. Electrical conductors 173 connect the slip rings 172 with the speed indicator 167.

Figure 1:
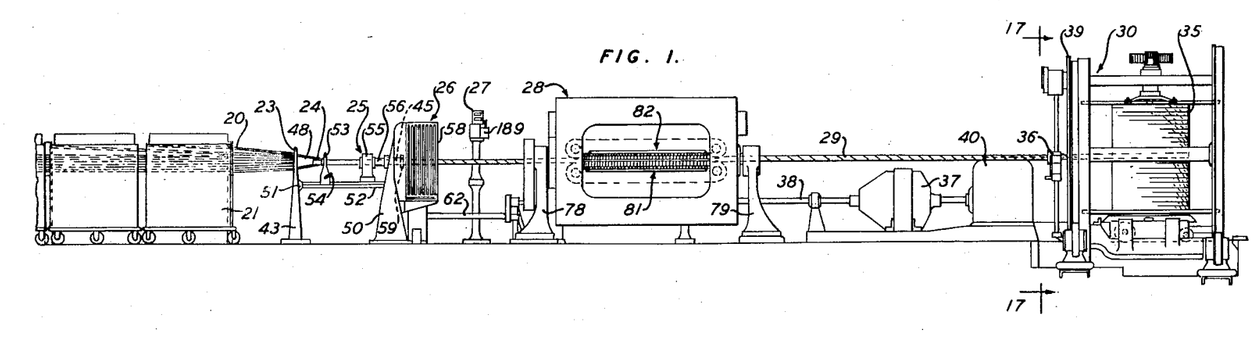
Fig. 1 is an elevational view showing a cable forming apparatus embodying the features of the invention.
Figure 2:
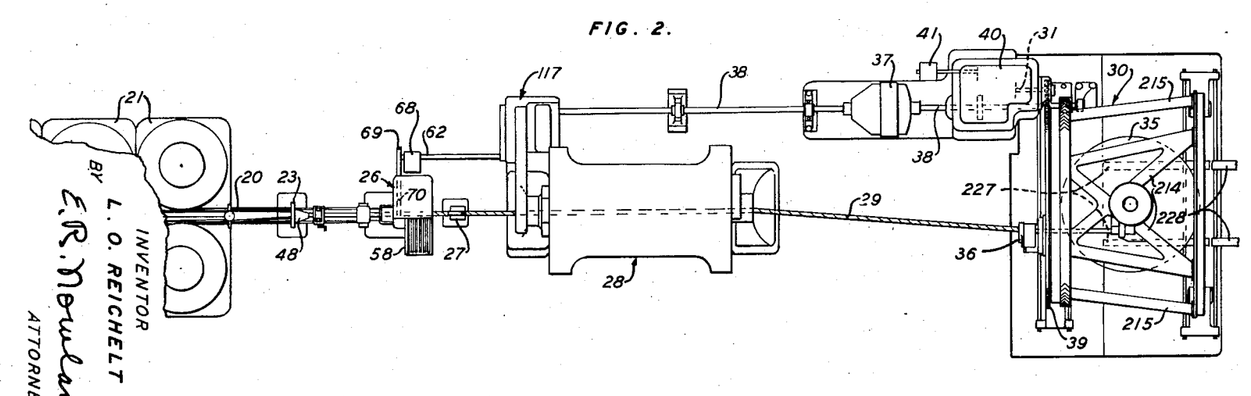
Fig. 2 is a plan view of the apparatus shown in Fig. 1.
Figure 3:
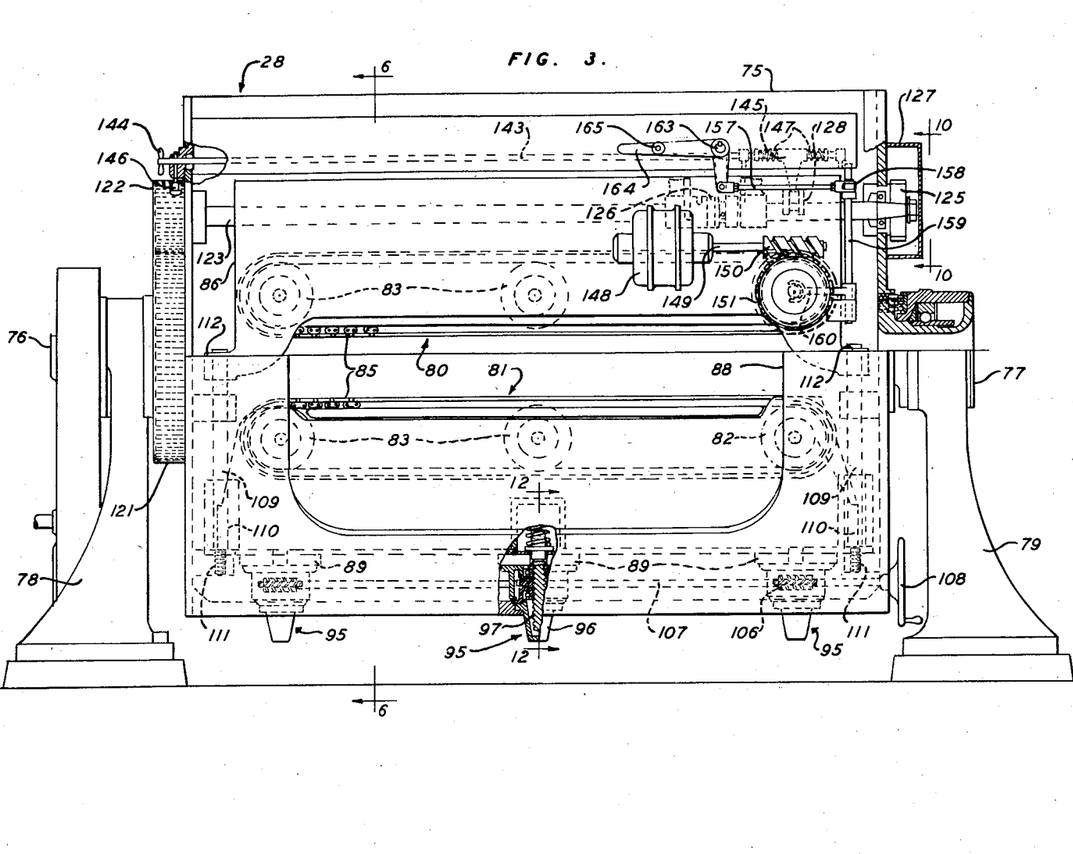
Fig. 3 is a right side elevational view of the capstan unit.
Figure 4:
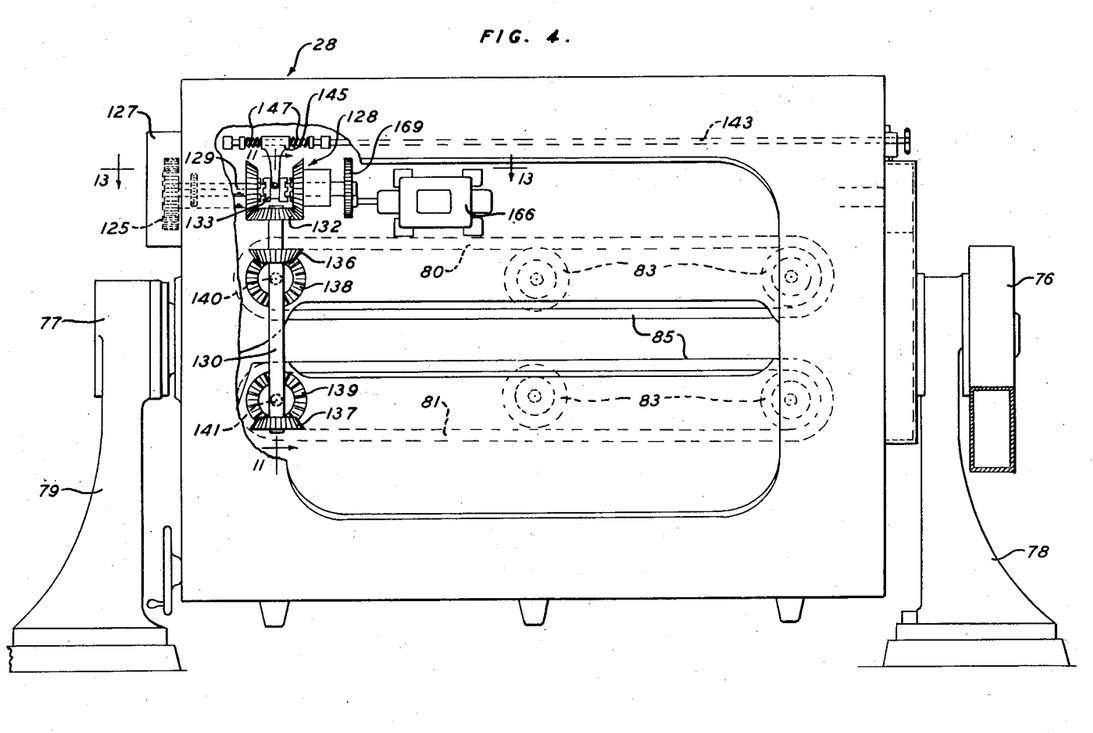
Fig. 4 is a left side elevational view of the capstan unit.
Figure 5:
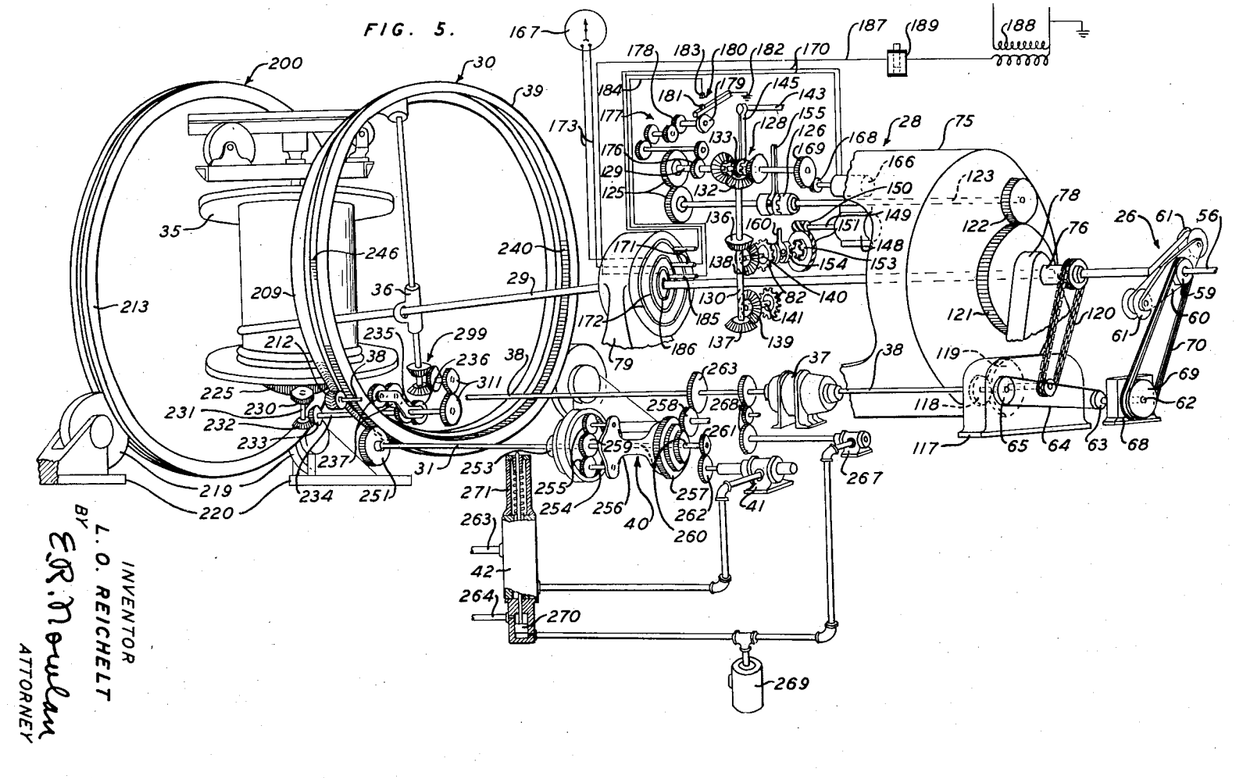
Fig. 5 is a diagrammatic perspective view in elevation from the rear of Fig. 1.
Figure 6:
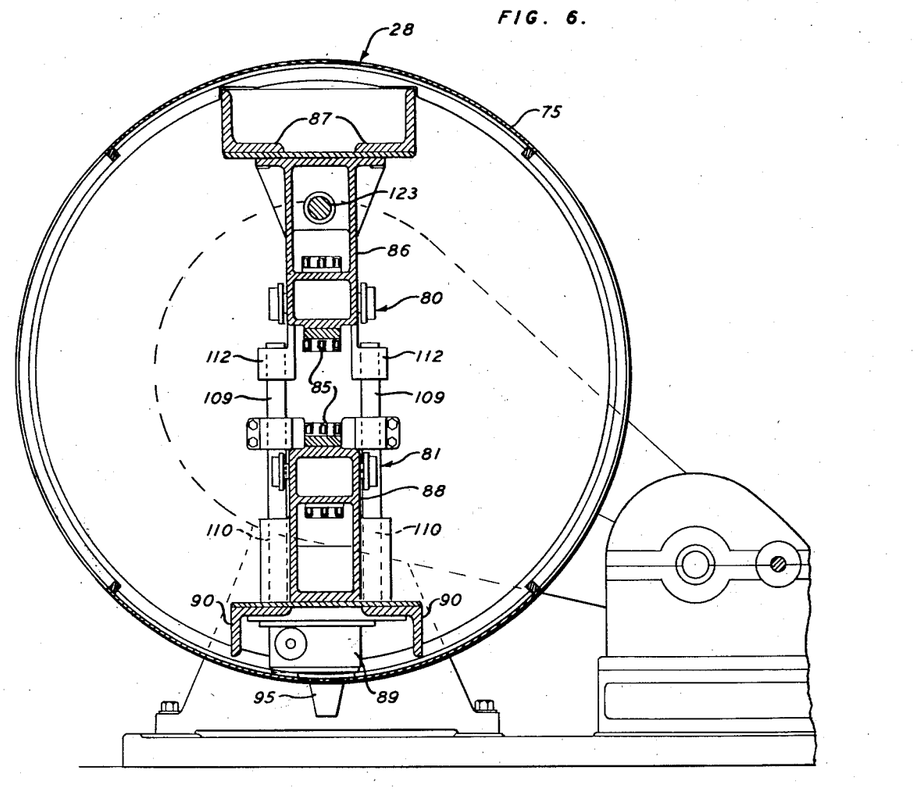
Fig. 6 is a sectional view taken along line 6—6 of Fig. 3.

The measuring apparatus for recording the length of the completed cable consists of a suitable measuring device 27 (Figs. 1 and 2) well known in the art and which is actuated electrically for each foot of cable passing through the capstan unit 28. The endless chain 85 (Fig. 4) is driven by a gear train hereinbefore described and connected with the shaft 129 (Figs. 4, 5 and 13) which is actuated by the main shaft 38 through the jaw clutch 126. Mounted upon the shaft 129 intermediate the change gears 125 and the bevel gear reversing mechanism 128 is a pinion 176 engaging a compensating gear train 177 (Fig. 5) of which a final gear 178 (Fig. 5) has affixed thereto a cam 179. A circuit breaker 180 (Fig. 5) of any suitable type well known in the art has a contact 181 connected to ground at 182 and engaging the cam 179, and another contact 183 connected to an electrical conductor 184 and a brush 185 suitably affixed to the shell 75 so as to make contact with a slip ring 186 rigidly mounted upon the pedestal 79. An electrical conductor 187 connects the slip ring 186 to a transformer 188 through a solenoid 189 (Fig. 5). The ratio of the gear train 177 (Fig. 5) is such as to cause the cam 179 to close the breaker 180 by closing the contacts 181 and 183 and opening the breaker contacts for each foot of cable passing through the capstan unit 28. The closing of the contacts of the breaker 180 (Fig. 5) completes a circuit from ground 182 through the electrical conductor 184, brush 185, slip ring 186, electrical conductor 187, solenoid 189 to the alternating current transformer 188, whereby the solenoid 189 is energized to actuate the counter (Figs. 1 and 2). When the cam 179 breaks the contacts of the breaker 180, the electrical circuit is interrupted by removing the ground 182 to de-energize the solenoid 189 to return it to the unoperated position. Succeeding electrical impulses are produced in the same manner to actuate the measuring device 27 for each foot of cable formed in the capstan unit 28.

As the endless chains 85 wear, the length thereof increases and it will be evident, therefore, that without provisions to compensate for the additional chain length, the measuring device 27 would record an inaccurate cable length. The compensation is accomplished in the gear train 177 by providing the correct gear ratio which is obtained by recording in the measuring device 27 the new length of the endless chains 85 against a known length of cable. In the aforementioned calibrating procedure, the endless chains 85 are actuated by the motor 148 in the manner hereinbefore described.

After the aforedescribed apparatus has been mounted in the interior of the shell 75, it may be found necessary to balance the assembly and the latter is accomplished by adding to the assembly a lead counterweight, or other suitable material, which is contained in the periphery of the shell 75. By balancing the shell in such a manner it has been found practicable to operate the apparatus safely at higher speeds than it would be possible otherwise.

*Take-up unit*

Figure 14:
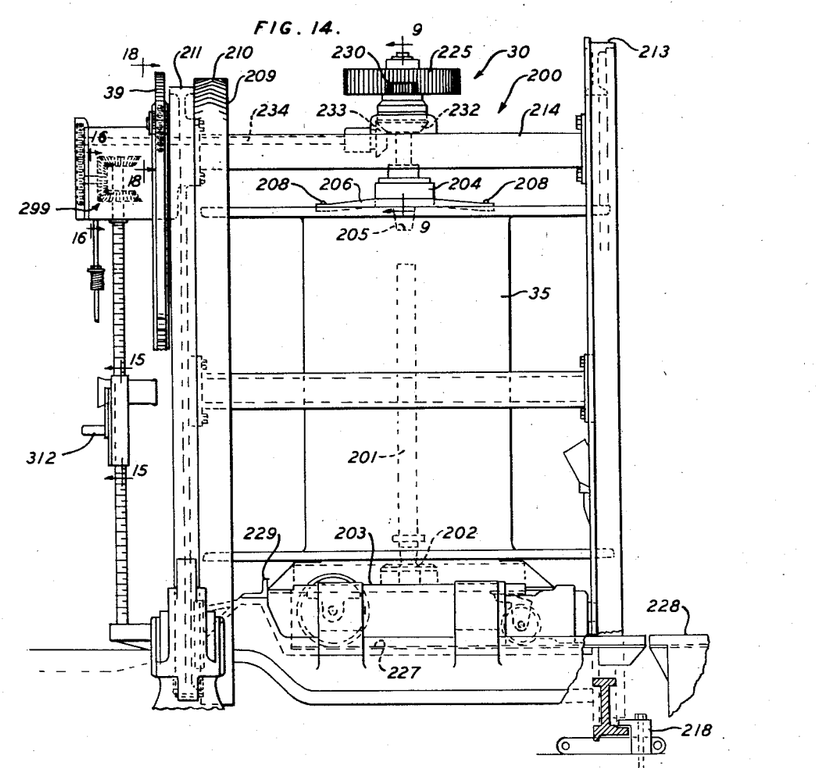
Fig. 14 is a right side elevational view of the take-up unit.
Figure 17:
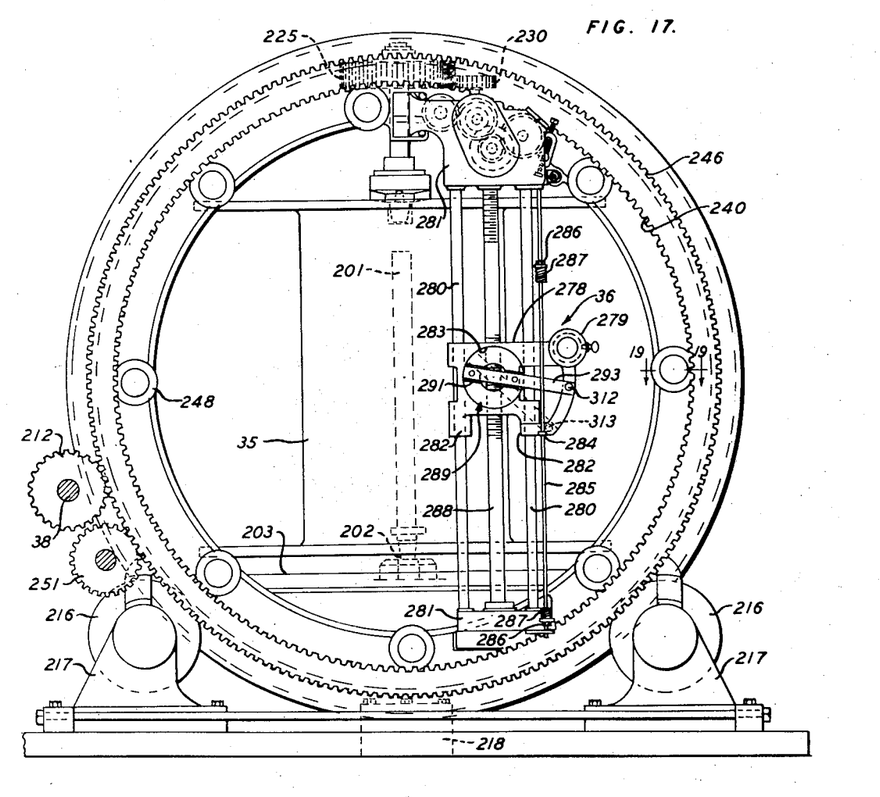
Fig. 17 is an elevational view of the take-up unit taken along line 17—17 of Fig. 1.

Inasmuch as the cable 29 is assembled, formed and twisted only during its passage between the distributor plate 23 and the capstan unit 28, the cabling operation is complete as the cable 29 passes from the latter and there remains only the final operation of storing upon a core truck as rapidly as it is passed from the capstan. The take-up unit 30 (Figs. 1, 2, 5, 8, 9, 14 to 19 inclusive) provides a mechanism for winding the cable 29 upon a core truck 35 which is rotatably mounted in a rotatable cradle 200 (Figs. 14 and 17). It will be understood, then, that the core truck 35 is rotating on its axis at the same time that it is being carried by the rotating cradle 200. The core truck 35 is rotatably mounted within the cradle 200 by having one end of a central shaft 201 formed in the core truck and projecting into an aperture 202 provided in the central part of the lower section 203 of the cradle 200, and by having an upper member 204 projecting into an aperture 205 formed in the upper central portion of the core truck 35. The member 204 is provided with rigid oppositely disposed arms 206, having slots formed in the extremities thereof so as to receive vertically projecting members 208 formed integral with the core truck 35, whereby the rotation of the core truck can proceed only upon the actuation of the rotatable member 204. The cradle 200 (Figs. 14 and 17) includes a ring 209 having an external peripheral edge which is preferably provided with herringbone teeth 210 and a smooth offset portion 211. A herringbone pinion 212 affixed to the main shaft 38 meshes with the external herringbone teeth 210 of the ring 209 to rotate the cradle 200. A ring 213 spaced from the ring 209 is connected therewith and the assembly braced by the cross members 214 and the longitudinal members 215. The ring 209 is rotatably mounted upon a pair of rollers 216 which are journaled in the housings 217 suitably secured to the foundation of the machine (Fig. 17).

A locking shoe 218 (Figs. 14 and 17) rigidly secured to the machine foundation engages an inner surface of the ring 213 to maintain the latter in engagement with a pair of rollers 219 spaced similarly to the rollers 216 and upon which the ring 213 is rotatably supported, the rollers 219 being journaled in the housings 220 which are suitably affixed to the machine foundation. The shoe 218 retains the ring 213 in engagement with the rollers 219 in the event that the cable becomes jammed on the core truck.

Referring to Figs. 5, 14 and 17, and particularly to the upper core truck supporting member 204, which is the core truck driving end, the member 204 has a gear 225 keyed thereto. It will be observed again at this point that the core truck 35 is rotatable only under control of the rotatable member 204 as hereinbefore stated by having its central shaft 201 rotatable in the central aperture 202 of the lower section 203 of the cradle 200.

Figure 18:
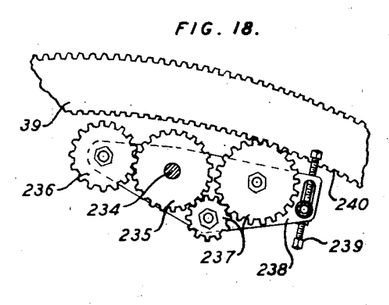
Fig. 18 is an enlarged fragmentary view taken on line 18—18 of Fig. 14 and showing details of the core truck driving mechanism of the take-up unit.
Figure 19:
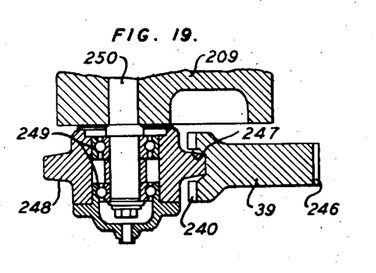
Fig. 19 is an enlarged sectional view taken along lines 19—19 of Fig. 17.

On the lower section of the cradle 200 intermediate the rings 209 and 213 there is provided a pair of rails 227 to align with the rails 228, suitably secured in the foundation of the machine, when the central axis 201 of the core truck 35 is in a vertical position. An angle iron stop 229 is provided upon the lower cradle section 203 so that the core truck is substantially positioned centrally of the cradle 200 after it has been rolled onto the rails 227 from the rails 228. It will be understood that the lower cradle portion 203 can be raised and lowered by any suitable means (not shown) so that the end portion of the central shaft 201 of the core truck projects into the aperture 202 and that the upper positioning member 204 can be raised and lowered by any suitable means (not shown) to engage the aperture 205 of the core truck with the arms 206 engaging the vertically projecting members 208 of the core truck. Suitable means (not shown) are provided upon the movable lower and upper cradle sections for locking the core truck in engagement therewith thereby obviating the possibility of displacement of the core truck as the cradle 200 is revolved. The gear 225 (Figs. 5, 9 and 14) is driven by a pinion 230 affixed to a spindle 231 which also has mounted thereupon a bevel gear 232 meshing with a bevel gear 233 keyed to a shaft 234, upon which is carried a pinion 235 meshing with a gear 236 and a gear train 237. The gear 236 and gear train 237 (Figs. 5, 14 and 18) are journaled in a housing 238 which is rotatable about the shaft 234 by means of a screw 239 whereby either the gear 236 or the gear train 237 is brought into engagement with inner peripheral teeth 240 of the floating ring 39 (Fig. 18).

A reversal of the rotary direction of the cradle 200 and the floating ring 39 would ordinarily necessitate a reversal in the rotation of the core truck 35, but the latter is avoided by engaging either the gear 236 or the gear train 237 with the inner peripheral teeth 240 of the floating ring 39 depending upon the original direction of rotation of the floating ring 39. The spindle 231 (Fig. 9) is provided with a ratchet 241 (Figs. 8 and 9) engageable with a pawl 242 whereby only a one-way drive is permitted for taking up slack in the cable between the capstan unit 28 and the core truck. It is the usual practice when starting to wind a cable upon an empty core truck to remove the slack after the end of the cable has been attached to the core truck by rotating the core truck manually in the direction in which it is adapted to be driven.

The floating ring 39 is also provided with external peripheral teeth 246 and an internal peripheral groove 247 extending into the ring more deeply than the base of the internal teeth 240. The groove 247 (Fig. 19) is utilized for receiving therein a plurality of rollers 248 mounted upon roller bearings 249 fitted upon pins 250 which are affixed to a side of the ring 209 thereby permitting the ring 39 to rotate freely on the rollers 248 (Fig. 17) to provide a mounting which is termed floating. It will be understood, then, that if the cabling machine were started the floating ring 39 would rotate at the same speed as the cradle ring 209 hence the gear 236 or gear train 237, whichever engages teeth 240 of floating ring 39, would be carried by the floating ring 39 and there would be no motion to actuate the gear 225 for driving the core truck. Therefore, it is evident that only a relative movement between the floating ring 39 and the cradle ring 209 causes any rotation of the gear 236 or gear train 237 to drive the gear 225, and in the instant embodiment of the invention, the floating ring 39 is caused to rotate slower than the cradle ring 209. To accomplish this relative movement the external teeth 246 of the floating ring 39 engage a pinion 251 which is mounted on a shaft 31, the opposite end of which is connected through a differential 40 to a retarding apparatus comprising a fluid pump 41 and a valve 42, which is of a type described in the copending application of E. J. Crane, filed December 10, 1930, Serial No. 501,209.

The retarding effect of the pinion 251 upon the rotation of the floating ring 39 is accomplished by means of the differential 40 (Fig. 5) in which the shaft 31 is keyed to a disc 253 formed with internal peripheral teeth 254 meshing with spider gears 255 which are rotatably mounted upon one end of a hollow spindle 256, the opposite end of which is provided with change gears 257. A tumbler gear 258 connects the change gears 257 with a pinion 263 mounted on the main shaft 38. The speed of the spindle 256 can be controlled by connecting any one of the three change gears 257 with the main shaft 38. Intermediate to the two spider gears 255 and meshing therewith is a gear 259 which is mounted upon a shaft 260. The shaft 260 is journaled in the hollow spindle 256 and has on its opposite end a gear 261 engaging a pinion 262 to rotate the fluid pump 41. The pump 41 is utilized to exhaust fluid through an opening 263 of the valve 42. When the main shaft 38 is actuated by the motor 37, the cradle 200 is rotated by the pinion 212 engaging the cradle ring 209, and the latter tends to carry the floating ring 39 therewith. As previously stated, if the cradle ring 209 and the floating ring 39 were to rotate in synchronism, the core truck would remain stationary. However, as the cradle ring 209 rotates, the floating ring 39 tends to rotate the pinion 251, shaft 31, and the disc 253 which drive one leg of the differential consisting of the spiders 255, spindle 256, change gears 257 and the tumbler gear 258 connected with the main shaft 38 at a speed which will permit the floating ring 39 to rotate in synchronism with the cradle ring 209. Aside from friction, it will be seen that this would be accomplished if no retarding force were exerted upon the floating ring 39.

The leg of the differential comprising the spiders 255, spindle 256 and change gears 257 is also driven at a constant speed by the main shaft 38. The floating ring 39 and the main shaft 38 actuate the gear 259 to operate the pump 41 for exhausting fluid through the opening 263 of the valve 42. It is evident, therefore, that the speed of rotation of the floating ring 39 depends upon the speed with which it can drive the pump 41, and the speed of the latter is directly controlled by the valve 42. When the throttling of the valve 42 is such as to offer sufficient resistance to the passage of fluid therethrough, the pump 41 is caused to rotate and thereby to impart a proportionate motion to the shaft 260 and gear 259 mounted on the end thereof in engagement with the spider gears 255. Since the spindle 256 carries the spider gears 255 at a constant speed around the gear 259, which is now slowly rotating, the spider gears 255 are caused to rotate rapidly on their individual axes to impart a rapid rotary movement to the disc 253. The speed of the shaft 31 and pinion 251 is controlled by the disc 253 and, therefore, are rotated at a speed somewhat less than that necessary to maintain the floating ring 39 in synchronous rotation with the cradle ring 209. It will be understood, then, that the pinion 251 offers a retarding effect upon the rotation of the floating ring 39 thereby causing a relative movement between it and the cradle ring 209 in a manner that the floating ring 39 is caused to rotate slower than the cradle ring 209. Depending upon the direction of rotation of the cradle 200, either the gear 236 or gear train 237 engages the inner peripheral teeth 240 of the floating ring 39 to drive the pinion 235 which actuates the gear 225 to rotate the core truck slowly in a manner hereinbefore described.

As the throttling of the valve 42 offers less and less resistance to the passage of fluid therethrough under pressure of the pump 41, the latter speeds up correspondingly to increase the speed of the gear 259. Since the spider gears 255 are carried around the gear 259 as a constant rate of speed by the main shaft 38, the increased speeds of the gear 259 cause the spider gears 255 to rotate more slowly on their individual axes and, consequently, to impart a slower rotary movement to the shaft 31 and pinion 251. A slower rotation of the pinion 251 further retards the rotation of the floating ring 39 to cause a larger relative movement between it and the cradle ring 209 whereby either the gear 236 or gear train 237 in engagement with the inner teeth 240 of the floating ring 39 speeds up to drive the pinion 235 and the gear 225 at a high speed to rotate the core truck more rapidly in the manner hereinbefore described. It is evident, therefore, that the retarding effect of the pinion 251 depends solely upon the speed of the pump 41 and the throttling of the valve 42 since the spider gears 255 are revolved about the gear 259 at a constant speed by the main shaft 38. In addition to the fact that the torque developed by the floating ring 39 drives the pump 41, it also rotates the hollow spindle 256 through the spider gears 255 engaging the disc 253 thereby assisting the motor 37 in actuating the main shaft 38. Obviously, then, the torque of the floating ring 39 materially reduces the torque which would be demanded of the main shaft 38 to drive the pump 41 without assistance.

The desired angular speed of the core truck and the desired tension on the cable are obtained by the initial throttling of the valve 42 whereby the resistance of the latter to the passage of fluid therethrough against which resistance the pump operates corresponds to that resistance required to drive the core truck with the desired tension on the cable. The increased starting torque required to be developed in the floating ring 39 to overcome the effects of inertia and the friction of the machine and to prevent a lag between the starting of the cradle 200 and the core truck is secured by providing the maximum resistance in the valve 42 against which the pump 41 operates so that a substantially constant tension is maintained on the cable until the machine is brought to operating speed. Obviously, when the machine is brought to operating speed, the tension on the cable would be excessive if there were no provisions to compensate for the difference in resistance between the starting and operating speeds of the machine. To obviate objectionable variations in cable tension during the acceleration, operating and deceleration speeds of the machine, an auxiliary pump 267 driven from the main shaft 38 by the gears 268 is employed to exhaust fluid through a valve 269 and the opening 264 of the valve 42 to control a piston 270 associated with the valve 42. The speed of the pump 267 is directly proportional to the speed of the main shaft 38 and, consequently, the piston 270 is raised and lowered predetermined amounts in accordance with the speed of the main shaft 38 to maintain a substantially constant tension on the cable during all speeds of the machine.

As cable is being wound onto the core track, the diameter thereof increases while the speed at which the cable is passed from the capstan unit 28 is constant, and it is evident, therefore, that the angular speed of the core truck must decrease correspondingly to maintain a constant tension on the cable. This is accomplished by adjusting the springs 271 associated with the piston 270 of the valve 42 to create a large back pressure on the valve 42 against which the pumps 41 and 267 operate, thereby causing an increase in the speed of the pump 41 which transmits, in a manner hereinbefore described, an increased speed to the pinion 251 which reduces its retarding effect upon the floating ring 39 to allow the latter gradually to approach the synchronous speed of the cradle ring 209. Obviously, a lessening of the relative motion between the floating ring 39 and the cradle ring 209 causes the core truck to be driven at a slower speed in the manner hereinbefore described. When the machine is slowly coming to a stop, the auxiliary pump 267 tends to lower the piston 270 gradually in order that the speed of the pump 41 can decrease to impart a decreasing retarding effect to the floating ring 39 whereby the speed of the core truck 35 decreases correspondingly to maintain a constant tension on the cable which is being wound thereon.

Figure 15:
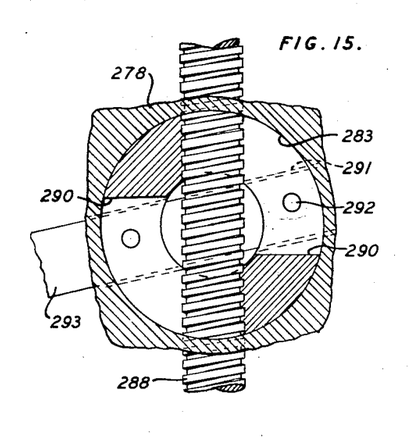
Fig. 15 is an enlarged fragmentary view taken along line 15—15 of Fig. 14 and showing details of the two piece distributor nut of the take-up unit.
Figure 16:
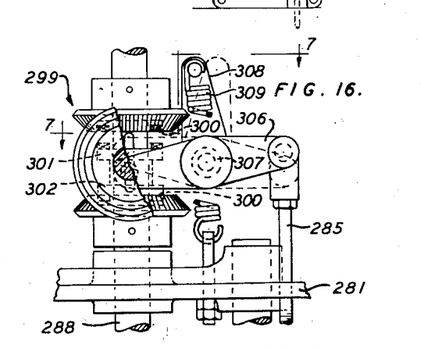
Fig. 16 is an enlarged fragmentary view, taken along line 16—16 of Fig. 14 and showing detail of the distributor reversing mechanism of the take-up unit.

A distributor 36 (Figs. 14, 15 and 17) comprises a distributor plate 278 carrying in a projecting portion a bell mouthed bushing 279 through which the cable passes and slidable upon the guide rods 280 which are anchored in brackets 281 suitably fastened upon a side of the ring 209. The distributor plate 278 is provided with bearings 282 which receive the guide rods 280 and contains in the central portion thereof an aperture 283 (Fig. 15). On the lower right hand side of the distributor plate 278 there is suitably affixed an apertured stop plate 284 which receives therethrough a stop rod 285, the opposite ends being slidably mounted in the brackets 281. Also, the opposite ends of the stop rod 285 are threaded and provided with stop nuts 286 and springs 287. The distributor plate 278 is raised and lowered between the stop nuts 286 by means of a rotating screw 288 engaging a one piece nut 289 (Fig. 15) having oppositely disposed threaded portions 290 (Fig. 15). The outer face of the nut 289 is provided with slots 291 within which bolts 292 secure a lever 293, one end thereof being provided with a spring pin 312.

The lever 293 is movable in a rotary direction through an arc of less than 90° and is employed to engage and disengage the threaded portions 290 of the nut 289 with the screw 288. This arrangement facilitates a free movement of the distributor 36 to any position along the screw 288 in order to permit the introduction of the cable to any desired point on the core truck.

Figure 7:
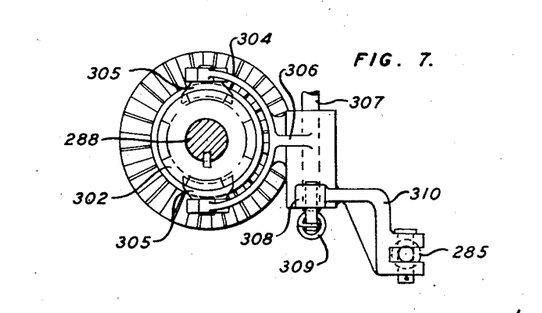
Fig. 7 is a fragmentary enlarged view taken along line 7—7 of Fig. 16 showing details of the distributor reversing mechanism.
Figure 8:
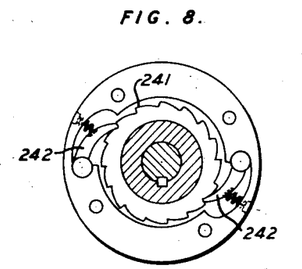
Fig. 8 is an enlarged fragmentary view taken along line 8—8 of Fig. 9.
Figure 9:
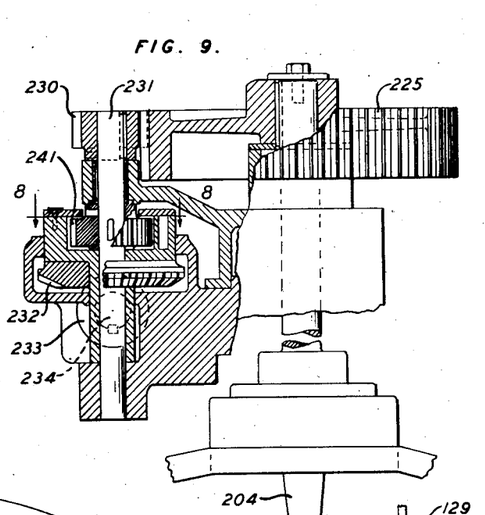
Fig. 9 is an enlarged fragmentary view taken along the line 9—9 of Fig. 14.

The screw 288 is rotated by means of a bevel gear reversing mechanism 299 (Figs. 14 and 16) which consists of jaw clutch sections 300 rigidly affixed to the oppositely positioned bevel gears in the mechanism 299. A jaw clutch section 301 slidably keyed to the screw 288 is provided with a peripheral groove 302 which receives a clutch fork 304 (Fig. 7) mounted upon bronze bearings 305. One end of the fork 304 is affixed to a lever 306 provided with a central pivot 307 suitably secured to the upper bracket 281. Projecting upwardly from the lever 306 is an arm 308 adapted at an end to engage one end of a tension spring 309, the opposite end of which is suitably fastened to the upper bracket 281 in a manner that the spring is in vertical alignment with the arm 308. On the end of the lever 306 opposite to the fork 304, is an offset portion 310 adapted to engage the stop rod 285. The bevel gear reversing mechanism 299 is operated by the pressure of the stop plate 284 alternately engaging the spring 287 bearing upon the nuts 286 to move the rod 285 in either an upward or downward direction.

It will be understood, then, that movements of the rod 285 cause the offset portion 310 of the lever 306 to extend upwardly or downwardly causing the toggle action whereby the arm 308 and the tension spring 309 are thrown out of vertical alignment. Depending upon the position of the offset portion 310 of the lever 306, the tension in the spring 309 causes the lever 308 to snap the fork 304 either upwardly or downwardly to slide the clutch section 301 into engagement with either of the clutch sections 300 affixed to bevel gears in the mechanism 299. The bevel gear reversing mechanism 299 is driven through the change gears 311 (Fig. 5) one of which is mounted upon the shaft 234, having a pinion 235 actuated by either the gear 236 or the gear train 237, depending upon the direction of rotation of the cradle 200. By means of the change gears 311, the speed of the screw 288 is adjusted to cooperate with the various diameters of cables manufactured by the apparatus. The one piece nut 289 is maintained in the "engaged" or "disengaged" position by means of the lever 293 which is locked in either position upon the distributor plate 278 by the engagement of the spring pin 312 with the apertures 313 provided in the distributor plate 278.

It will be understood from the aforegoing description of the apparatus that the invention is particularly adaptable for the manufacture of a single cable from a plurality of individual cable units. The invention is obviously capable of various applications, and is to be limited only by the scope of the appended claims.

What is claimed is:

1. In a cable forming apparatus, a plurality of cable unit supply means, means for assembling a plurality of said units into a group, a rotatable cylindrical member for twisting the cable as it is formed, endless means mounted within said member for engaging the cable to advance it through said rotatable cylindrical member, common means for actuating said rotatable member and said endless means, and optionally operable means for driving said endless means independently of said cylindrical member.

2. In a cable forming apparatus, a plurality of cable unit supply means, means for assembling a plurality of said units into a group, a rotatable cylindrical member for twisting the cable as it is formed, endless means mounted within said member for engaging the cable to advance it through said rotatable cylindrical member, and a planetary gearing arrangement for actuating said endless means.

3. In a cable forming apparatus, a plurality of cable unit supply means, means for assembling a plurality of said units into a group, a rotatable cylindrical member for twisting the cable as it is formed, endless means mounted within said member for engaging the cable to advance it through said rotatable cylindrical member, means for actuating said endless means, and means for registering the rate of speed at which said cable is advanced through said rotatable member comprising an electrical generator located within said rotating member, a meter located external to said rotating member, brushes associated with said rotatable member and connected to said generator, and stationary slip rings associated with said meter and said brushes.

4. In a cable forming apparatus, a plurality of cable unit supply means, means for assembling a plurality of said units into a group, a rotatable cylindrical member for twisting the cable as it is formed, endless means mounted within said member for engaging the cable to advance it through said rotatable cylindrical member, a planetary gearing arrangement for actuating said endless means, and means for recording the length of cable which is advanced through said rotatable member comprising a recording mechanism and a solenoid, both of which are located external to said rotatable member, and a gear train located within said rotatable member and operatively connected with said planetary gearing arrangement for controlling the operation of said solenoid for actuating said recording mechanism.

5. In a cable forming apparatus, a plurality of rotatable cable unit supply means, means for assembling a plurality of said units to form a cable, a rotatable cylindrical means having its axis of rotation coincident with the axis of said cable for twisting said cable as it is formed, opposing endless means mounted in the cylindrical means to engage said cable therebetween for advancing it through said apparatus, means including a planetary gear arrangement for actuating said cylindrical means and said endless means, means optionally operable for driving said endless means independently of said first mentioned actuating means, and common means for rendering effective said independent means for driving said endless means, and for simultaneously rendering ineffective said actuating means for driving said endless means.

6. In a cable forming apparatus, a plurality of rotatable cable unit supply means, means for assembling a plurality of the units to form a cable, a cylindrical shell having a shaft end portion, a gear mounted coaxially with said shaft end portion of said cylindrical shell, means for rotating said shell for twisting said cable as it is formed, opposing endless means mounted within said shell for engaging said cable therebetween, means engaging said gear and revolved therearound to rotate said endless means for advancing said cable, and means connected with said rotating means associated with said endless means and responsive to the rotation of said rotating means for indicating the rate of speed at which said endless means advances said cable.

7. In a cable forming apparatus, a plurality of rotatable cable unit supply means, means for assembling a plurality of the units into a group, means for binding said group to form a cable, a rotatable cylindrical means having its axis of rotation coincident with the axis of said cable, means for actuating said cylindrical means to twist said cable as it is formed, opposing endless means mounted within said cylindrical means for engaging said cable therebetween to advance said cable, means affixed to said cylindrical means and operable in response to the rotation thereof for driving said endless means, and a motor mounted in said cylindrical means and optionally operable for driving said endless means.

8. In a cable forming apparatus, a plurality of rotatable cable unit supply means, means for assembling a plurality of said units into a group, means for binding said group to form a cable, a cylindrical shell, a sun gear affixed coaxially with said shell, means for rotating said shell to twist said cable as it is formed, opposing endless means mounted within said shell for engaging said cable therebetween, a planet gear engaging said sun gear and revolving therearound to drive said endless means for advancing said cable through the apparatus, means operatively associated with said planet gear for controlling the direction of rotation of said endless means irrespective of the direction of rotation of said shell, and means connected with said planet gear driving means and operable in response to the actuation thereof for recording the length of cable passing through said endless means.

9. In a cable forming apparatus, a plurality of rotatable cable unit supply means, means for assembling a plurality of the units into a group, means for binding said group to form a cable, a cylindrical member rotatable coaxially with said cable for twisting said cable as it is formed, opposing endless means rotatably mounted within said cylindrical means and engaging said cable therebetween for advancing said cable, means including a planetary gear arrangement for actuating said member and said endless means, a motor mounted within said cylindrical member for optionally actuating said endless means independently of said first mentioned actuating means, and means for rendering effective said first mentioned actuating means for driving said endless means and simultaneously rendering ineffective said motor actuating means for driving the endless means independently of first mentioned actuating means.

10. In a cable forming apparatus, a plurality of rotatable cable unit supply means, means for assembling a plurality of units into a group, means for binding said group to form a cable, a rotatable cylindrical member having the axis of rotation coincident with axis of said cable and twisting said cable as it is formed, opposing endless means mounted within said member to engage said cable therebetween for advancing said cable, means including a planetary gear arrangement for actuating said member and said endless means, a motor mounted within said cylindrical member for optionally driving said endless means independently of said first mentioned actuating means, means for rendering effective said motor and simultaneously rendering ineffective said first mentioned actuating means for driving the endless means, and means operatively associated with said planetary gear arrangement for controlling the direction of rotation of said endless means.

11. In a cable forming apparatus, a plurality of cable unit supplies, means for binding the units to form a cable, a rotatable member for twisting said cable as it is formed, opposing endless means mounted within said rotatable member for engaging said cable therebetween to advance said cable, means comprising a worm and screw arrangement associated with one of said endless means for controlling the pressure with which said cable is engaged between said endless means, means including a planetary gear arrangement for actuating said member and said endless means, a motor mounted within said rotatable member for driving said endless means independently of said first mentioned actuating means, means for selectively operating said endless means, means connected with said planetary gear arrangement and operable in response to the actuation thereof for registering the length of said cable advancing through said endless means, and means connected with said planetary gear arrangement and operable in response to the actuation thereof for indicating the rate of speed at which said endless means is advancing said cable.

12. In a cable forming apparatus, a plurality of cable unit supplies, means for binding said units to form a cable, a rotatable cylindrical member having its axis of rotation coincident with the axis of said cable for twisting said cable as it is formed, opposing endless means mounted within said rotatable member for engaging said cable therebetween for advancing said cable, means including a planetary gear arrangement for actuating said rotatable member and said endless means, a circuit breaker, a counting mechanism, a solenoid associated with said counting mechanism, a gear train connected with said planetary gear arrangement and arranged to operate said breaker and said solenoid for each predetermined length of said cable passing through said endless means for actuating said counting mechanism to record the total length of said cable, an indicating means, and a magneto connected with said planetary gear arrangement and responsive to the speed thereof for operating said indicating means to record the rate of speed at which said endless means is advancing said cable.

13. In a cable forming apparatus, a plurality of rotatable cable unit supplies, means for binding a plurality of said units to form a cable, a rotatable cylindrical shell having its axis of rotation coincident with the axis of said cable for twisting the cable as it is formed, a tractor type capstan rotatably mounted within said shell for advancing said cable through said apparatus, means for actuating said shell and said capstan, means for controlling the direction of rotation of said capstan, means associated with said actuating means for controlling the speed of said capstan, means operatively connected with said actuating means for recording the length of said cable passing through said apparatus, and means connected with said actuating means and operable in response to the actuation thereof for indicating the rate of speed at which said cable is passing through said apparatus.

14. In a cable forming apparatus, a plurality of unit supplies, means for binding said units to form a cable, a rotatable shell having its axis of rotation coincident with the axis of said cable for twisting said cable as it is formed, opposing endless means mounted within said shell for engaging said cable therebetween to advance it through said apparatus, means including a planetary gear arrangement for actuating said shell and said endless means, means associated with said planetary gear arrangement for controlling the speed at which said endless means advances said cable through said apparatus, a core truck for receiving said cable, a rotatable cradle for said core truck, a floating ring associated with said cradle, hydraulic means operatively connected with said floating ring for rotating said cradle and said floating ring at different relative speeds, and means responsive to the difference between said relative speeds for rotating said core truck.

15. In a cable forming apparatus, a plurality of rotatable cable unit supplies, means for assembling a plurality of said units into a group, means for binding said group to form a cable, a rotatable cylindrical means having its axis of rotation coincident with axis of said cable for twisting said cable as it is formed, opposing endless means mounted within said cylindrical means for engaging said cable therebetween, a planetary gear arrangement for actuating said endless means, means for actuating said cylindrical means and said first mentioned actuating means, a motor mounted within said cylindrical means for driving said endless means independently of said first mentioned actuating means, means for selectively operating said endless means, means operatively associated with said planetary gear arrangement for controlling the direction of rotation of said endless means, a rotatable take-up unit for receiving said cable, common means for actuating said take-up unit, said cylindrical means, and said planetary gear arrangement, and hydraulic means operatively connected with said take-up unit and said common actuating means for maintaining a constant tension on said cable as it is received into said take-up unit.

16. In a cable forming apparatus, a plurality of unit supplies, means for assembling said units to form a cable, a rotatable cylindrical means having its axis of rotation coincident with the axis of said cable for twisting said cable as it is formed, endless means mounted therein for advancing said cable through said apparatus, a core truck for receiving said cable, a rotatable cradle for said core truck, a floating ring associated with said cradle, common means for actuating said cylindrical means and said cradle, a pump, a valve through which said pump discharges fluid, a differential engaging said pump and operatively connected with said floating ring and said actuating means for rotating said floating ring and said cradle at different relative speeds, and means operable in response to said difference in relative speeds for rotating said core truck.

17. In a cable forming apparatus, a plurality of unit supplies, means for assembling said units to form a cable, a rotatable cylindrical means having its axis of rotation coincident with the axis of said cable for twisting said cable as it is formed, endless means mounted therein for advancing said cable through said apparatus, a core truck for receiving said cable, a rotatable cradle for said core truck, a floating ring associated with said cradle, common means for actuating said cylindrical means and said cradle, a pump, a valve through which said pump discharges fluid, a differential engaging said pump and operatively connected with said floating ring and said actuating means for rotating said floating ring and said cradle at different relative speeds, means operable in response to the difference between said relative speeds for rotating said core truck, and an auxiliary hydraulic means connected with said actuating means and said valve for controlling the discharge of fluid through said valve to maintain a predetermined tension on said cable during the accelerating, operating and decelerating speeds of said apparatus.

18. In a cable forming apparatus, a plurality of cable unit supplies, means for assembling said units to form a cable, a rotatable shell having its axis of rotation coincident with the axis of said cable for twisting said cable as it is formed, opposing endless means mounted within said shell for engaging said cable therebetween to advance it through said apparatus, means including a planetary gear arrangement for rotating said shell and said endless means, a gear train associated with said rotating means for controlling the speed at which said endless means advances said cable through said apparatus, a core truck for receiving said cable from said endless means, a rotatable cradle for said core truck, a floating ring associated with said cradle, means for actuating said cradle and said rotating means, a pump, a valve through which said pump discharges fluid, means engaging said pump and operatively connected with said floating ring and said actuating means for rotating said floating ring at a speed different from the speed of said cradle, and means operable in response to said difference in speeds for rotating said core truck.

19. In a cable forming apparatus, a plurality of cable unit supplies, means for assembling said units to form a cable, a rotatable shell having its axis of rotation coincident with the axis of said cable for twisting said cable as it is formed, opposing endless means mounted within said shell for engaging said cable therebetween to advance it through said apparatus, means including a planetary gear arrangement for actuating said shell and said endless means, means associated with said planetary gear arrangement for controlling the speed at which said endless means advances said cable through said apparatus, means operatively connected with said planetary gear arrangement for indicating the rate of speed at which said endless means advances said cable, a core truck for receiving said cable, a rotatable cradle for said core truck, a floating ring associated with said cradle, means for actuating said cradle and said first mentioned actuating means, hydraulic means, a differential gearing engaging said hydraulic means and operatively connected with said floating ring and said second mentioned actuating means for rotating said floating ring at a speed different from the speed of said cradle, and means operable in response to said difference in speeds for rotating said core truck.

20. In a cable forming apparatus, a plurality of cable unit supplies, means for assembling said units into a group, means for binding said group to form a cable, a rotatable shell having its axis of rotation coincident with the axis of said cable, endless means rotatably mounted in said shell and engaging said cable therebetween to advance it through said apparatus, means including a planetary gear arrangement for actuating said shell and said endless means, a core truck for receiving said cable, a rotatable cradle for said core truck, a floating ring operatively connected with said core truck, common means for actuating said cradle and said first mentioned actuating means, hydraulic means operatively connected with said floating ring and said common actuating means for rotating said floating ring and said cradle at different relative speeds, means responsive to said difference in relative speeds for driving said core truck, and auxiliary hydraulic means connected to said common actuating means and responsive to the speed of rotation thereof for controlling the effect of said floating ring on said first mentioned hydraulic means to maintain a predetermined tension on said cable during the operation of said apparatus.

In witness whereof, I hereunto subscribe my name this 29th day of February, 1932.

LESTER O. REICHELT.